US007428620B2

(12) United States Patent
Fisher et al.

(10) Patent No.: US 7,428,620 B2
(45) Date of Patent: Sep. 23, 2008

(54) METHOD FOR SWITCHING DATA LIBRARY MANAGERS

(75) Inventors: James Arthur Fisher, Tucson, AZ (US); Anthony Andrew Lambert, Tucson, AZ (US); Dennis Paul Martinez, Tucson, AZ (US); Tom Owen Pringle, Tucson, AZ (US); Timothy Clyde Sample, Tucson, AZ (US); Christine Lynette Telford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 10/644,139

(22) Filed: Aug. 19, 2003

(65) Prior Publication Data

US 2005/0044329 A1 Feb. 24, 2005

(51) Int. Cl.
*G06F 12/00* (2006.01)
*G06F 13/00* (2006.01)

(52) U.S. Cl. .................. 711/154; 711/200; 711/209; 713/200

(58) Field of Classification Search .......... 711/202–209, 711/100, 154, 200; 713/200, 165, 166
See application file for complete search history.

(56) References Cited

U.S. PATENT DOCUMENTS

| 5,544,304 A * | 8/1996 | Carlson et al. ............... 714/10 |
| 5,914,919 A | 6/1999 | Fosler et al. ................. 369/34 |
| 6,006,308 A * | 12/1999 | Matsunami et al. ......... 711/114 |
| 6,052,341 A | 4/2000 | Bingham et al. ............. 369/34 |
| 6,061,309 A | 5/2000 | Gallo et al. ................... 369/34 |
| 6,336,173 B1 | 1/2002 | Day, III et al. .............. 711/161 |
| 6,553,401 B1 | 4/2003 | Carter et al. ................. 709/200 |
| 2002/0188711 A1* | 12/2002 | Meyer et al. ................. 709/223 |
| 2003/0014667 A1* | 1/2003 | Kolichtchak ................ 713/201 |
| 2003/0037184 A1 | 2/2003 | Day et al. ....................... 710/1 |
| 2003/0041283 A1 | 2/2003 | Murphy et al. ................ 714/13 |
| 2003/0217078 A1* | 11/2003 | Carlson et al. .............. 707/200 |

* cited by examiner

*Primary Examiner*—Tuan V. Thai
(74) *Attorney, Agent, or Firm*—Kunzler & McKenzie

(57) ABSTRACT

A device, method, and system for switching library managers of a data library while maintaining data library storage devices online. A library manager accepts and executes data transaction commands for access to data residing on the storage devices of the data library. A transition manager module receives a directive to transition library management functions from a first library manager to a second library manager. The transition manager module stops the first library manager from accepting new data transaction commands while maintaining the storage devices online. The first library manager may execute previously accepted data transaction commands. The transition manager module suspends the library management functions of the first library manager and activates the library management functions of the second library manager. The storage devices of the data library may complete data transaction commands throughout the library manager transition.

12 Claims, 6 Drawing Sheets

METHOD FOR SWITCHING DATA LIBRARY MANAGERS

BACKGROUND OF THE INVENTION

1. The Field of the Invention

The invention relates to devices, methods, and systems for managing data libraries. Specifically, the invention relates to devices, methods, and systems for switching library managers in a data library system.

2. The Relevant Art

Systems of mainframe computers or servers frequently maintain large data libraries. Data libraries typically contain many storage devices including hard disk drives, tape drives, and optical storage drives. Computers retrieve data from and store data to the storage devices in the data library through a device controller.

A computer, usually a host computer, issues a data transaction command to the device controller. The device controller employs one or more library managers to coordinate accessing data in the data library. The library manager schedules and executes the data transaction command on the storage devices.

A system administrator often must switch library managers from a first library manager to a second library manager. Switching library managers typically requires that the storage devices in the data library be forced offline and that the data transaction commands awaiting execution be canceled. The first library manager is suspended and the second library manager is activated. Storage devices must be varied online or restarted before the second library manager can resume receiving and executing data transaction requests. Library managers may also be switched by taking the data library offline and allowing the data transaction commands awaiting execution to complete. The data library must be varied online to resume standard data library operation.

FIG. 1 is a block diagram illustrating a representative data library system 100 of the current technology. The system 100 includes one or more host computers 105, one or more library managers 110, one or more storage devices 115, and a device controller 120. The system 100 shows the functional elements of a data library.

The host computer 105a issues a data transaction command to the device controller 120. The device controller 120 assigns the data transaction command to the first library manager 110a for data to be retrieved from or saved to the storage device 115. The first library manager 110a directs a storage device 115 to complete the command. The depicted data library system 100 also includes a second library manager 110b.

A system administrator switches library management functions from the first library manager 110a to a second library manager 110b. In the depicted system, the system administrator forces the storage devices 115 offline and suspends the first library manager 110a from accepting data transaction commands. Previously accepted data transaction commands are lost. The system administrator then activates the second library manager 110b and varies the storage devices 115 online, allowing the second library manager 110b to execute data transaction commands.

In other systems, the system administrator takes the data library system 100 offline and allows previously accepted data transaction commands to complete. The system administrator suspends the first library manager 110a and activates the second library manager 110b. The data library system 100 is varied online or otherwise placed on-line to resume data library operations.

FIG. 2 is a flow chart diagram illustrating a library manager transition method 200 of the current technology. The method 200 includes a force storage device offline step 205, a notify host step 210, a take library offline step 215, a switch library manager step 220, a vary storage device step 225, an inform host step 230, and an end step 235.

A system administrator activates the method 200. The force storage device offline step 205 forces the storage devices 115 in the data library system 100 offline. The notify host step 210 communicates to the host computer 105 that the data library retained by the storage devices 115 will be unavailable. The take library offline step 215 takes the data library offline, making the library inaccessible to the host computer 105.

The switch library manager step 220 commands the first library manager 110a to suspend library management functions. The step 220 further directs the second library manager 110b to activate library management functions. The vary storage device step 225 varies the storage devices 115 online under the management of the second library manager 110b. The inform host step 230 communicates to the host computer 105 that the data library has resumed accepting data transaction commands. The end step 235 terminates the method 200.

Taking storage devices 115 or the data library system 100 offline lengthens the time required to switch library managers and slows data processing functions. Data library functions would be enhanced if library managers could be switched without taking storage devices 115 or the data library system 100 offline.

What is needed is a method for switching library managers while the data library remains online. What is more particularly needed is a device, method, and system for switching library managers while maintaining storage devices online.

SUMMARY OF THE INVENTION

The various elements of the present invention have been developed in response to the present state of the art, and in particular, in response to the problems and needs in the art that have not yet been fully solved by currently available methods for transitioning data library managers. Accordingly, the present invention provides an improved method, apparatus, and system for switching library managers in a data library system.

In one aspect of the present invention, an apparatus for switching library managers is presented. The apparatus includes a control module, a communications module, and a timing module. The control module, communications module, and timing module are configured to manage switching library managers for a data library. The data library may reside on one or more storage devices. A library manager accepts data transaction commands and executes the commands using the storage devices. Typically only one library manager is active.

During a library manager transition, library management functions for a data library are switched from a first library manager to a second library manager. The communications module receives a directive for the library manager transition. The control module receives and sends communications through the communications module.

The control module is also configured to direct the first library manager to reject new data transaction commands. The storage devices of the data library remain online and may continue to complete commands. In one embodiment, the first library manager continues to execute accepted data transaction commands. The first library manager may also continue to accept select data transaction command types.

The control module is configured to suspend the management functions of the first library manager. In one embodiment, the first library manager's library management functions are suspended when accepted data transaction commands are executed. In an alternate embodiment, the library management functions are suspended prior to the execution of all accepted data transaction commands.

The control module activates the library management functions of the second library manager. The second library manager then accepts and executes data transaction commands. The storage devices remain online and capable of completing data transaction commands throughout the library manager transition. The second library manager may execute data transaction commands without waiting for storage devices to be varied online and resume completing commands.

In one embodiment, the timing module receives a directive to limit the duration of the library manager transition. The directive is received through the communications module. The timing module may initiate a timeout period and notify the control module of the end of the timeout period. Responsive to the timing module, the control module may terminate execution of data transaction commands by the first library manager and activate the library management functions of the second library manager.

In another aspect of the present invention, a method for switching library managers is presented. The method rejects new data transaction commands for retrieving data from or storing data to a data library during a library manager transition. The storage devices of the data library are maintained online and able to complete previously accepted data transaction commands. The method suspends the library management functions of a first library manager and activates the library management functions of a second library manager. Various elements of the present invention are combined into a system for switching library managers. The system includes a first library manager performing library management functions. The first library manager executes a data transaction command, directing the storage devices of a data library to retrieve or store data. A second library manager may also reside on the system, but not actively manage the data library.

A system administrator directs a transition manager module to switch library management functions from the first library manager to a second library manager. In one embodiment, the transition manager module resides in a device controller. In an alternate embodiment, the transition manager module is distributed throughout the library management system. The transition manager module may notify a host computer that a library manager transition has commenced and that no new data transaction commands will be accepted. The first library manager may process previously accepted data transaction commands during the library manager transition.

The transition manager module suspends the library management functions of the first library manager and activates the management functions of a second library manager.

The second library manager accepts and executes data transaction commands. The transition manager module informs the host computer that the library manager transition is complete and that the second library manager will accept new data transaction commands.

In one embodiment, the present invention facilitates the switching of library managers in a data library while maintaining storage devices online responsive to data transaction commands. In another embodiment, the present invention also supports the orderly execution of previously accepted data transaction commands during a library manager transition. The various elements and aspects of the present invention may provide a rapid, efficient means of switching library managers, decreasing data processing delays due to idle systems during the library manager transition. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices. Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
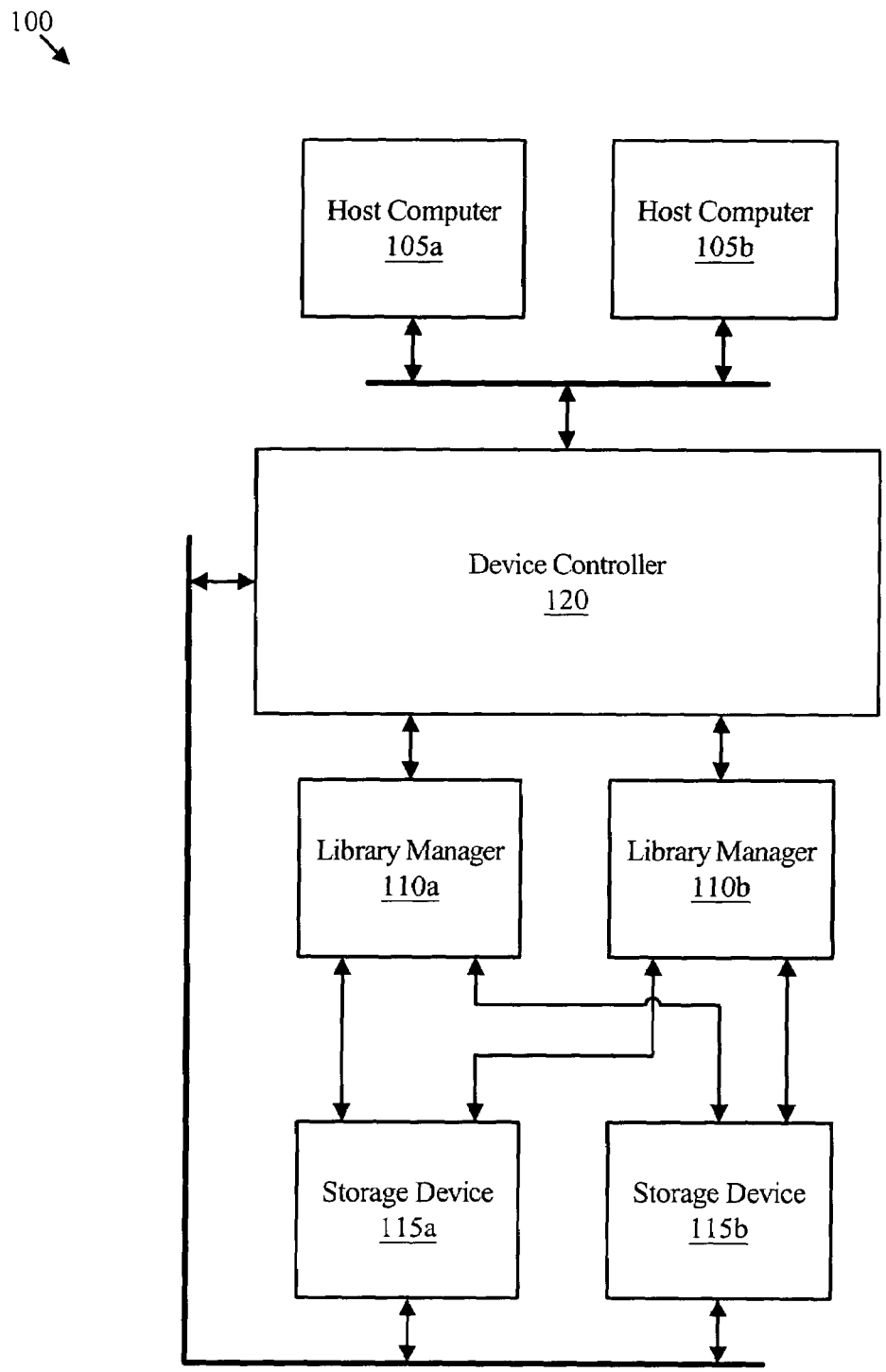
FIG. 1 is a block diagram illustrating a data library system of the current technology.
Figure 2:
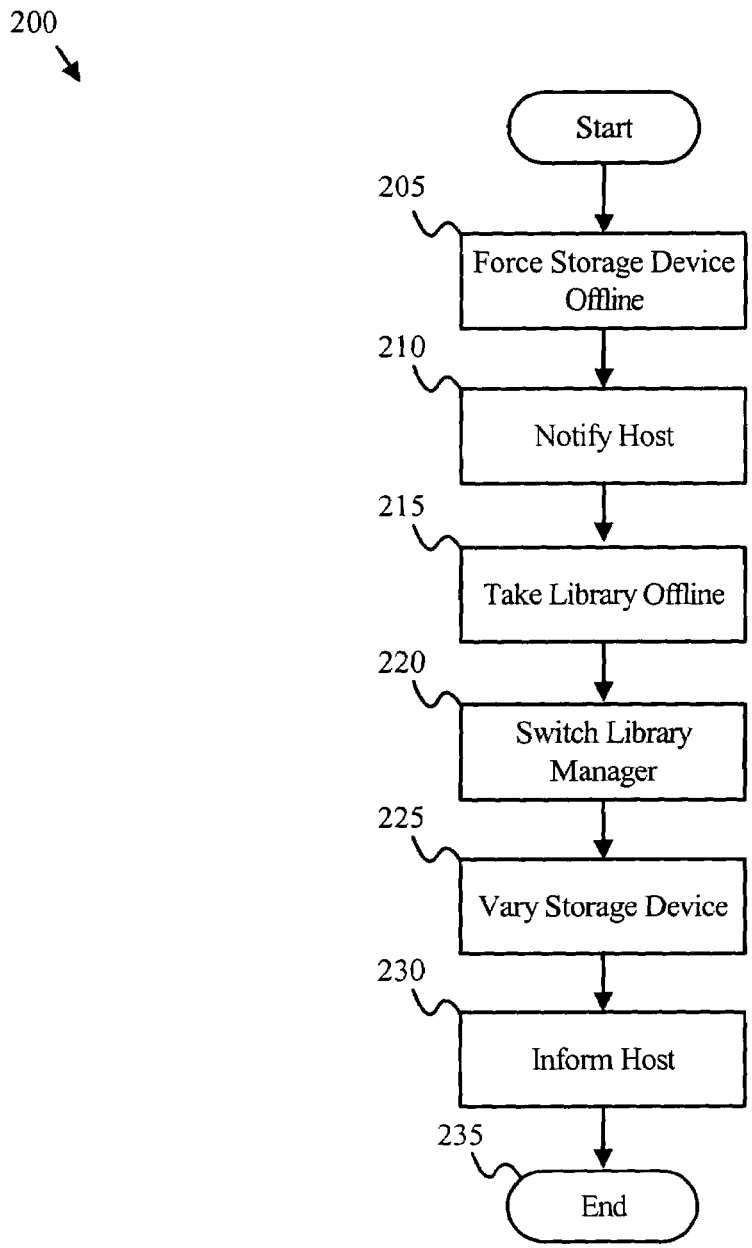
FIG. 2 is a flow chart illustrating a library manager transition method of the current technology.
Figure 3:
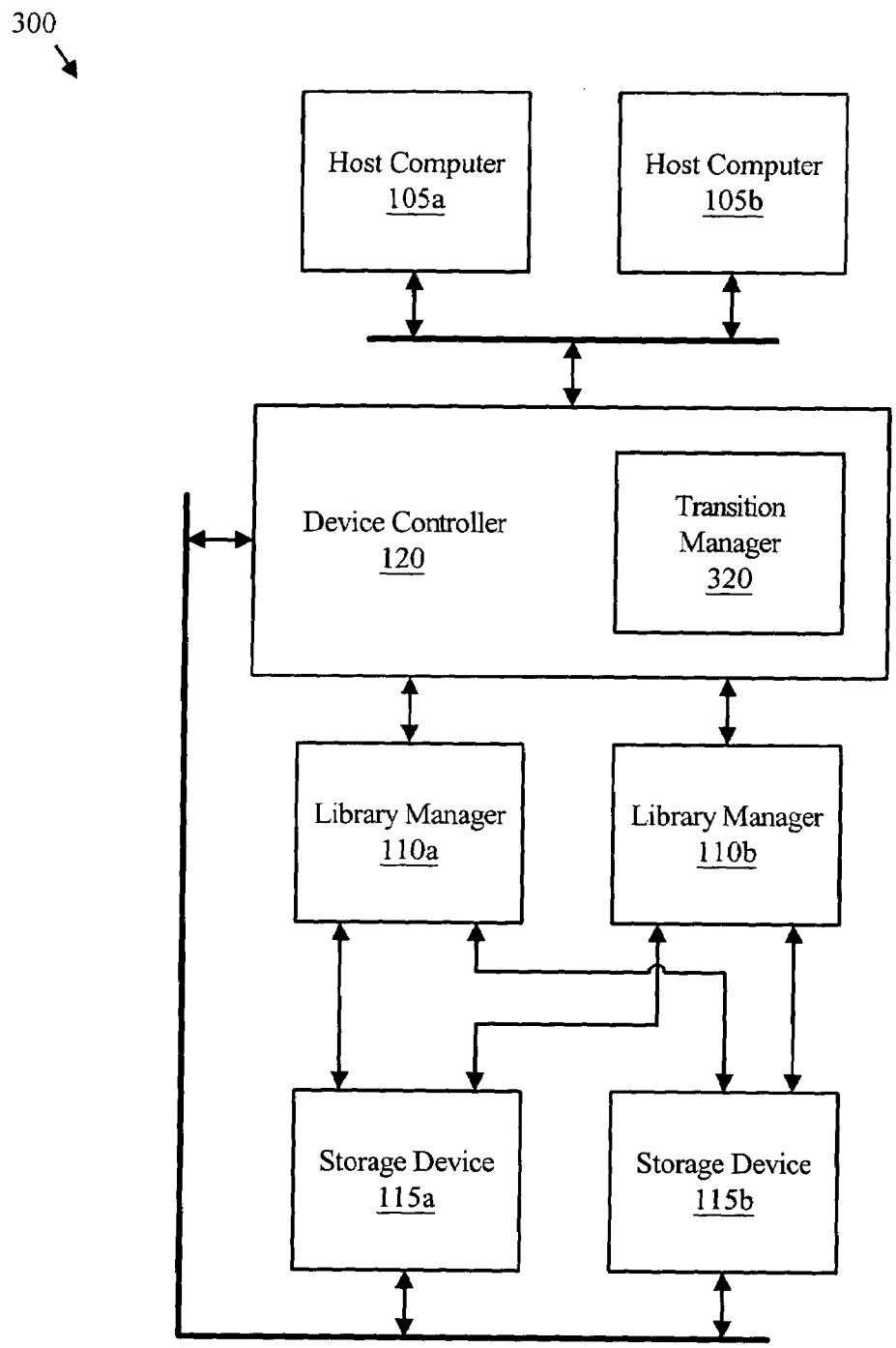
FIG. 3 is a block diagram illustrating one embodiment of a library management system of the present invention.

FIG. 3 is a block diagram illustrating one embodiment of a library management system 300 of the present invention. The system 300 includes one or more host computers 105, a transition manager module 320, a device controller 120, one or more library managers 110, and one or more storage devices 115. The transition manager module 320 may be located within the device controller 120 or may be implemented independent thereof. The library management system 300 is configured to retrieve and store data. The system 300 is also configured to conduct a library manager transition.

In operation, the library manager 110 accepts data transaction commands to retrieve data from or store data to the storage devices 115. The library manager 110 may execute data transaction commands immediately or store the data transaction commands for later execution. The storage devices 115 complete data transaction commands, retrieving and storing data.

The transition manager module 320 receives a directive from the system administrator to switch library management functions from a first library manager 110a to a second library manager 110b. The transition manager module 320 suspends the first library manager 110a from accepting new data transaction commands, but maintains the storage devices 115 online. Storage devices 115 may continue to complete data transaction commands executed by the first library manager 110a. In one embodiment, the transition manager module 320 directs the first library manager 110a to execute previously accepted data transaction commands in the command queue. In an alternate embodiment, the transition manager module 320 transfers previously accepted data transaction commands from the first library manager 100a to the second library manager 110b.

The transition manager module 320 suspends the library management functions of the first library manager 110a and activates the library management functions of the second library manager 110b. The storage devices 115 are capable of completing data transaction commands from the second library manager 110b.

The system 300 allows library managers 110 to be switched without forcing storage devices 115 offline. In addition, the system 300 may resume data library operations without varying storage devices 115 online. The system 300 further supports completing previously accepted data transaction commands during the library manager transition.

Figure 4:
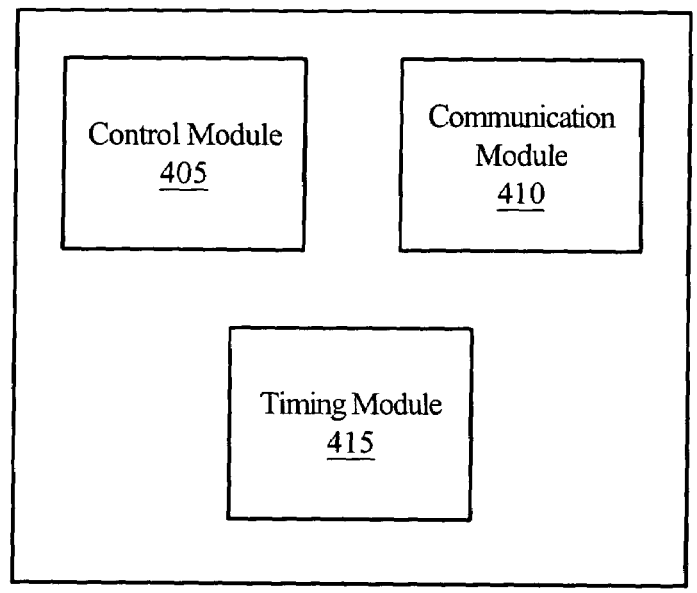
FIG. 4 is a block diagram illustrating one embodiment of a transition manager module of the present invention.

FIG. 4 is a block diagram illustrating one embodiment of a transition manager module 320 of the present invention. The module 320 includes a control module 405, a communications module 410, and a timing module 415. The transition manager module 320 manages a library manager transition in the library management system 300.

The communications module 410 receives a directive from the system administrator to switch library managers from a first library manager 110a to a second library manager 110b. The communications module 410 forwards the directive to the control module 405. In one embodiment, the control module 405 directs the first library manager 110a to stop accepting new data transaction commands. The control module 405 may also direct the host computer 105 to stop issuing data transaction commands. In one embodiment, the control module 405 issues directives through the communications module 410.

In one embodiment, the control module 405 directs the first library manager 110a to execute previously accepted data transaction commands. The control module 405 may also terminate the execution of previously accepted data transaction commands.

In an alternate embodiment, communications module 410 receives a timeout directive from the system administrator. The communications module 410 communicates the timeout directive to the timing module 415 and the control module 405. The timing module 415 may begin timing a timeout period in response to a timeout directive. In one embodiment, the timeout period is specified by the system administrator. The timeout period may also be predetermined. The timing module 415 notifies the control module 405 when the timeout period completes. The control module 405 may terminate the execution of previously accepted data transaction commands by the first library manager 110a in response to notification that the timeout period has been completed.

The control module 405 directs the first library manager 110a to suspend library management functions and further directs the second library manager 110b to activate library management functions. In one embodiment, the control manager 405 informs the host computer 105 that the host computer 105 may resume issuing data transaction commands.

The transition manager module 320 switches library managers 110 without forcing storage devices offline. Additionally, the transition manager module 320 may allow the first library manager 110a to complete previously accepted data transaction commands. The transition manager module 320 further activates the library management functions of the second library manager 110b with the storages devices 115 remaining capable of completing commands, allowing the library management system 300 to rapidly resume operation.

Figure 5:
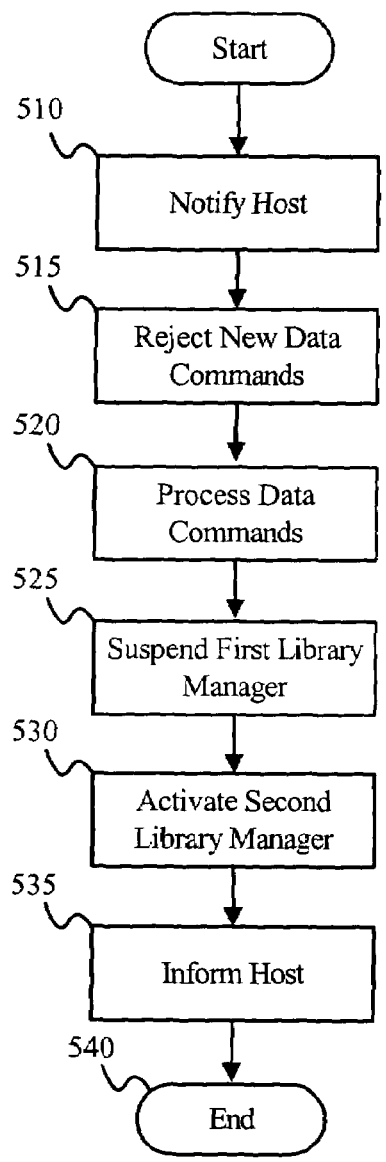
FIG. 5 is a flow chart illustrating one embodiment of a library manager transition method of the present invention.

FIG. 5 is a flow chart illustrating one embodiment of a library manager transition method of the present invention. The method 500 is illustrated herein being conducted using the system 300 of FIGS. 3 and 4, but may also be conducted independently thereof. The method 500 includes a notify host step 510, a reject new data commands step 515, a process data commands step 520, a suspend first library manager step 525, an activate second library manager step 530, an inform host step 535, and an end step 540. The method 500 transitions library management functions in the library management system 300 from the first library manager 110a to the second library manager 110b. Although for purposes of clarity the steps of the method 500 are depicted in a certain sequential order, execution within an actual system may be conducted in parallel and not necessarily in the depicted order.

The notify host step 510 communicates to the host computer 105 that the data library will be unavailable, and that new data transaction commands will not be accepted. The reject new data commands step 515 rejects new data transaction commands directing access to data in the storage devices 115. The process data commands step 520 executes previously accepted data transaction commands. In one embodiment, accepted data transaction commands are stored in a command queue.

The suspend first library manager step 525 suspends the first library manager 110a from performing library management functions. The activate second library manager step 530 activates the second library manager 110b performing library management functions. The inform host step 535 communicates to the host computer 105 that the second library manager 110b is ready to accept and execute data transaction commands. The end step 540 terminates the method 500.

The library manager transition method 500 switches library management functions without taking storage devices 115 or data library system 100 offline. The method 500 also allows previously accepted data transaction commands to be completed during the library manager transition.

Figure 6:
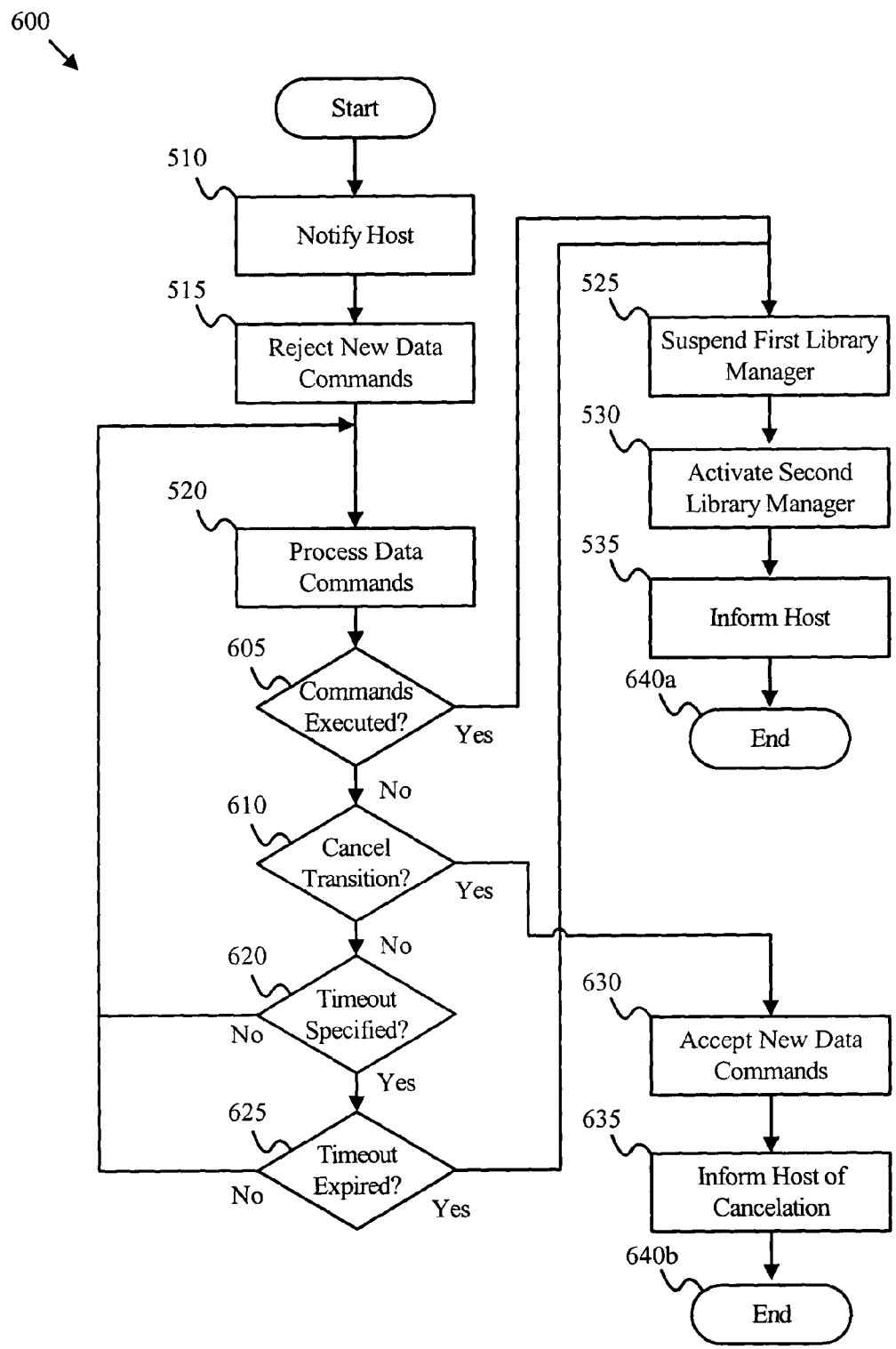
FIG. 6 is a flow chart illustrating a further embodiment of a library manager transition method of the present invention.

FIG. 6 is a flow chart illustrating a further embodiment of a library manager transition method of the present invention. The method 600 is illustrated herein being conducted using the system 300 of FIGS. 3 and 4, but may also be conducted independently thereof. The method 600 includes a notify host step 510, a reject new data commands step 515, a process data commands step 520, a suspend first library manager step 525, an activate second library manager step 530, an inform host step 535, a commands executed test 605, a cancel transition test 610, a timeout specified test 620, a timeout expired test 625, an accept new data commands step 630, an inform host of cancellation step 635, and one or more end steps 640. The library manager transition method 600 switches library managers 110 while allowing a system administrator additional transition options. Although for purposes of clarity the steps of the method 600 are depicted in a certain sequential order, execution within an actual system may be conducted in parallel and not necessarily in the depicted order.

Steps 510, 515, 520, 525, 530, and 535 perform the same functions as described in the library manager transition method 500 of FIG. 5. The commands executed test 605 determines if the first library manager 110a has executed all previously accepted data transaction commands. If the first library manager 110a has executed all accepted data transaction commands, the method 600 loops to the suspend first library manager step 525.

If the first library manager 110a has not executed all of the data transaction commands in the command queue, the method 600 proceeds to the cancel transition test 610. The cancel transition test 610 determines if a system administrator has directed the cancellation of the library manager transition. If the system administrator has directed the cancellation of the library manager transition, the method 600 proceeds to the accept new data commands step 630. The accept new data commands step 630 directs the first library manager 110a to accept data transaction commands. The inform host of cancellation step 635 communicates to the host computer 105 that the library manager transition is canceled, and that the first library manager 110a will accept data transaction commands. The method 600 terminates with the end step 640b.

If the system administrator has not directed the cancellation of the library manager transition, the method 600 proceeds from the cancel transition test 610 to the timeout specified test 620. The timeout specified test 620 determines if the system administrator specified a timeout period for the library manager transition. If no timeout period was specified, the method 600 loops to the process data commands step 520. If a timeout period was specified, the method 600 proceeds to the timeout expired test 625.

The timeout expired test 625 determines if the time interval expended by the first library manager 110a processing previously accepted data transaction commands exceeds the timeout period specified by the system administrator. If the time interval expended by the first library manager 110a has not exceeded the timeout period, the method 600 loops to the process data commands step 520. If the time interval has exceeded the specified timeout period, the method 600 loops to the suspend first library manager step 525. The end step 630a terminates the method 600.

The library manager transition method 600 allows the system administrator to terminate the execution of previously accepted data transaction commands during the library manager transition. The method 600 further allows the system administrator to limit the execution of previously accepted data transaction commands to within a specified timeout period.

In one embodiment, the present invention facilitates the switching of library managers in a data library while maintaining storage devices online responsive to data transaction commands. In another embodiment, the present invention also supports the orderly execution of accepted data transaction commands during a library manager transition. The various elements and aspects of the present invention may provide a rapid, efficient means of switching library managers, decreasing data processing delays due to idle systems during the library manager transition. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for switching library managers, the method comprising:
   rejecting data transaction commands, except for new data transaction commands of a specified data transaction command type, at a first library manager during a transition of library management functions from the first library manager to a second library manager
   maintaining a storage device responsive to data transaction commands of the specified data transaction command types;
   suspending the library management functions of the first library manager; and
   activating the library management functions of the second library manager.

2. The method of claim 1, further comprising notifying a host computer that the library manager transition is in process.

3. The method of claim 1, further comprising informing a host computer that the library manager transition is complete.

4. The method of claim 1, further comprising terminating execution of a previously accepted data transaction command.

5. The method of claim 1, further comprising executing a previously accepted data transaction command.

6. A computer readable storage medium comprising computer readable program code for switching library managers, the program code configured to:
   reject a data transaction commands, except for new data transaction commands of a specified data transaction command type, for access to a storage devic during a transition of library management functions from the first library manager to a second library manager;
   maintain the storage device responsive to data transaction commands of the specified data transaction command type;
   suspend the library management functions of the first library manager; and
   activate the library management functions of a second library manager.

7. The computer readable storage medium of claim 6, wherein the program code is further configured to notify a host computer that a library manager transition is in process.

8. The computer readable storage medium of claim 6, wherein the program code is further configured to inform the host computer that the library manager transition is complete.

9. The computer readable storage medium of claim 6, wherein the program code is further configured to store an accepted data transaction command.

10. The computer readable storage medium of claim 9, wherein the program code is further configured to execute the accepted data transaction commands.

11. The computer readable storage medium of claim 9, wherein the program code is further configured to transfer a previously accepted data transaction command from the first library manager to the second library manager during the library manager transition from the first library manager to the second library manager.

12. The computer readable storage medium of claim 6, wherein the program code is further configured to terminate the execution of the accepted data transaction command.

\* \* \* \* \*